No. 863,959. PATENTED AUG. 20, 1907.
S. B. WILLIAMSON.
REINFORCING BAR FOR CONCRETE, &c.
APPLICATION FILED JAN. 19, 1907.

WITNESSES:
Nathan F. Fretter
Brennan B. West

INVENTOR,
Sydney B. Williamson.
BY Bates, Fouts & Hull,
ATTYS.

UNITED STATES PATENT OFFICE.

SYDNEY B. WILLIAMSON, OF BALTIMORE, MARYLAND.

REINFORCING-BAR FOR CONCRETE, &c.

No. 863,959.　　　　　Specification of Letters Patent.　　　　Patented Aug. 20, 1907.

Application filed January 19, 1907. Serial No. 353,031.

*To all whom it may concern:*

Be it known that I, SYDNEY B. WILLIAMSON, residing at Baltimore, in the county of Baltimore city and State of Maryland, have invented a certain new and useful Improvement in Reinforcing-Bars for Concrete and Like Material, of which the following is a full, clear, and exact description, reference being had to the accompanying drawings.

Figure 1:
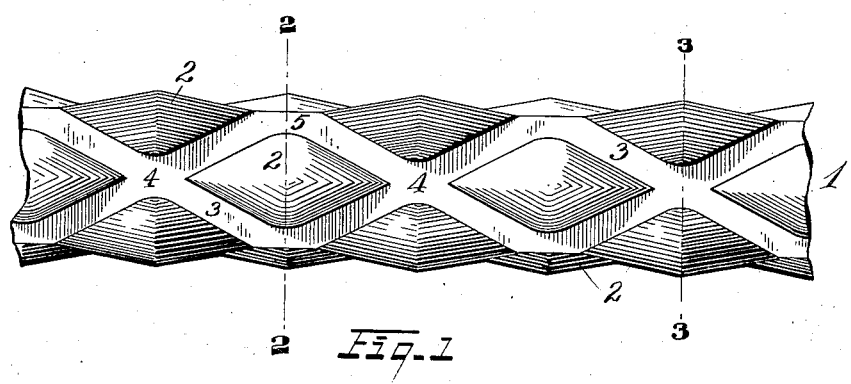
Figure 2:
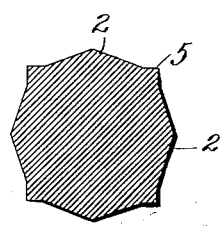
Figure 3:
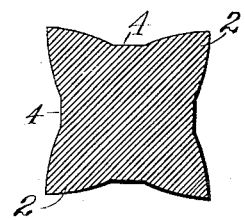
Figure 4:
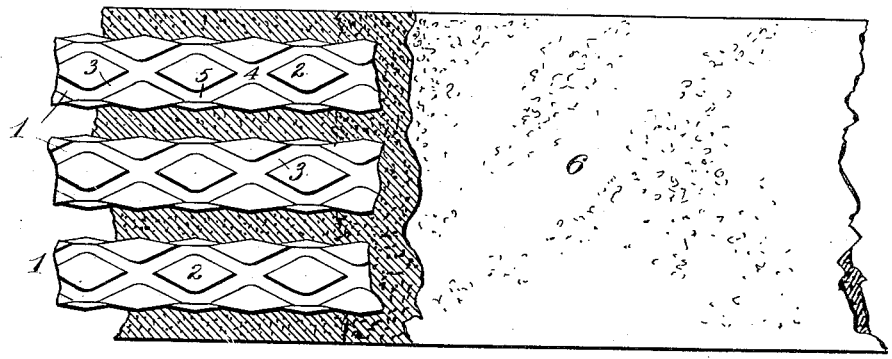

My invention relates to reinforcing bars for concrete, artificial stone, or similar material used in the construction of buildings, bridges and the like, and has for its objects the provision of a bar of this kind that will form a rigid mechanical bond with the material in which it is embedded; that will retain a relatively large proportion of the original cross-sectional area of the stock from which the bar is formed; that will be substantially uniform in sectional area throughout its length; that will so engage the material in which it is embedded as to greatly increase the resistance against elongation; and that will at the same time be of such shape as to enable it to be rolled with comparative ease and to render cheap the matter of constructing and dressing the rolls. These objects are accomplished by the device illustrated in the drawings, wherein Figure 1 represents a plan view of a portion of a bar constructed in accordance with my invention; Figs. 2 and 3 represent transverse sectional views taken on the correspondingly numbered lines of Fig. 1; and Fig. 4 represents a plan view of a beam or similar structure, a portion thereof being broken away to show a plurality of my bars applied thereto.

Describing the parts by reference numerals, 1 represents a bar constructed in accordance with my invention. This bar is polygonal in cross section, and each face thereof is provided, preferably by passing the stock through suitable rolls, with a series of lozenge- or diamond-shaped projections 2 inclosed or bounded by recesses or depressions 3, said recesses or depressions being sinuous, as shown more particularly in Fig. 1. Two such recesses or depressions 3 are provided in each face of the bar, said recesses intersecting and merging at the central portion of each face, as shown at 4, and diverging therefrom in opposite directions as far as the opposite edges of each of said faces and there merging with said edges and the corresponding portions of the recesses in the adjoining faces, as shown at 5. From 5, said recesses converge, again merging at the central portion of the face. Each face of the bar is provided with similar elevations 2 and channels 3, and said channels and elevations are so arranged that a transverse section taken through the bar will cut corresponding parts of said channels and elevations in each face thereof, as more particularly indicated in Figs. 2 and 3. The apex of each of the projections or elevations 2 is at substantially the same height as the corresponding portion of the original stock before the same was subjected to the action of the rolls.

In Figs. 2 and 3, the original surfaces of the stock are indicated by the dotted lines which appear on the exterior of the rolled bar 1.

The elevations or projections 2, as will appear more particularly in Figs. 1, 2 and 3, are highest at the central portion thereof and diminish gradually and uniformly in height toward the ends and sides thereof until they merge with the recesses 3.

As will appear further from an inspection of Figs. 1, 2 and 3, the elevations at the corners of the bar alternate with the elevations in the center, so that a section taken through the central portions of the corner elevations will pass through the intersection 4 of the recesses 3, while a section taken through the central portions of the elevations which are within the faces of the bar will pass through the portions 5 of the continuous recesses 3, at the corners of said bar. At each corner of the bar, there is thus provided a recess which is deepest at a point about half-way between the highest portions of the adjacent corner elevations 2, such recesses being located entirely within the original corner of the stock. Furthermore, by the relative arrangement of the projections which are entirely within the faces of the bar and those which are at the corners of the bar, the height of each elevation at the corner will increase as the height of each elevation within the faces decreases, and vice versa.

By the peculiar shape and arrangement of the recesses and elevations, the bar, while retaining a very high proportion of the original cross-sectional area of the stock before rolling, is of substantially constant cross-sectional area throughout its length. The provision of the elevations 2 with the recesses 3 is of great importance in maintaining a rigid mechanical bond between the bar and the concrete when the bar is stressed, and at the same time enabling the concrete to resist the elongation of the bar when so subjected to stress. When one of these bars is subjected to stress which elongates the same, such elongation reduces the sectional area of the bar and causes the side edges thereof to approach each other. The presence of the concrete in the recesses or channels and between the elevations resists the approach of the edges toward each other and the narrowing and elongating of the bar. Therefore, when a bar is embedded in concrete, as in beam 6, and the beam and bar are stressed, instead of shrinking away from the concrete the bar tends, through the action of the elevations and depressions, to grip the concrete more firmly within the depressions. At the same time, the concrete in such depressions sets up a counteracting stress in the bar against elongation, while the arrangement and location of the recesses diminish the horizontal shear in the vicinity of the bar.

By the peculiar construction of the bar set forth herein, I am enabled to form a rigid mechanical bond between the same and the material in which it is embedded. At the same time, I have produced a bar which, by reason of its configuration, may be readily and cheaply rolled. Furthermore, the matter of constructing and dressing the rolls is readily and cheaply accomplished.

I claim:

1. A bar for the purpose specified, said bar being polygonal in cross section and having within each face thereof elevations projecting therefrom and having at the intersections of its faces elevations intermediate of the elevations in the faces and diminishing in height from the longitudinal central portion to the ends thereof, substantially as specified.

2. A bar for the purpose specified, said bar being polygonal in cross section and having within each face thereof diamond- or lozenge-shaped elevations, said elevations being highest at the central portions thereof and diminishing in height therefrom, said bar having at the intersections of its faces similar elevations, substantially as specified.

3. A bar for the purpose specified, said bar being polygonal in cross section and having each face thereof provided with diamond- or lozenge-shaped elevations and having at the intersection of its faces similar elevations, said elevations diminishing in height from the longitudinal central portion of the same, the elevations in the faces being staggered with respect to those formed at the intersections of the faces, substantially as specified.

4. A bar for the purpose specified, said bar being polygonal in cross section and having each face thereof provided with elevations, said bar also having within each face thereof recesses inclosing or bounding said elevations, said elevations diminishing in height from the central portions thereof toward said recesses substantially as specified.

5. A bar for the purpose specified, said bar being polygonal in cross section and having each face thereof provided with a series of projections, said projections being entirely within each face of the bar and being bounded by converging and diverging recesses, said projections diminishing in height from the central portions thereof toward said recesses substantially as specified.

6. A bar for the purpose specified, said bar being polygonal in cross section and having within each face thereof a series of diamond-shaped elevations and having at the intersections of its faces similar elevations, said bar having in each face thereof a pair of recesses, the recesses in each face merging at the central portion of the face between the elevations therein and merging with the corner edges of the bar between the elevations thereof, said elevations diminishing in height from the central portions thereof toward the recesses, substantially as specified.

7. A bar for the purpose specified, said bar being polygonal in cross section and having within each face thereof a series of diamond-shaped elevations and having at the intersection of its faces similar elevations, said bar also having recesses bounding said elevations and merging at the corner edges of the bar, and said elevations diminishing in height from the central portions thereof toward the inclosing recesses substantially as specified.

8. A bar for the purpose specified, said bar being polygonal in cross section and having one or more faces thereof provided with diamond or lozenge-shaped elevations and having sinuous recesses bounding said elevations, said elevations diminishing in height from the central portions thereof toward said recesses, substantially as specified.

9. A bar for the purpose specified having within each face thereof a pair of sinuous recesses, said recesses merging at the central portion of each face and diverging therefrom and extending to and merging with the side edges of said bar, the recesses in one face occupying a position corresponding to the positions occupied by the recesses in the other faces, and diamond-shaped projections inclosed by said recesses and diminishing in height from their central portions toward said recesses, substantially as specified.

In testimony whereof, I hereunto affix my signature in the presence of two witnesses.

SYDNEY B. WILLIAMSON.

Witnesses:
 W. N. MEADE,
 W. R. NICHOLS.